United States Patent [19]
Benedict

[11] 3,859,808
[45] Jan. 14, 1975

[54] COLD TRAP FOR PURGING AIR FROM A GAS DIFFUSION SYSTEM

[75] Inventor: Manson Benedict, Westfield, N.J.

[73] Assignee: The United States of America as represented by the Director of Scientific Research and Development Office for Emergency Mangagment, Washington, D.C.

[22] Filed: Apr. 5, 1946

[21] Appl. No.: 659,716

[52] U.S. Cl. ................................. 62/55.5, 55/158
[51] Int. Cl. .............................................. B01d 5/00
[58] Field of Search .............. 23/264, 294; 62/55.5; 55/158

[56] References Cited
UNITED STATES PATENTS

| | | | |
|---|---|---|---|
| 1,518,126 | 12/1924 | Reed | 23/294 |
| 1,976,933 | 10/1934 | Cobert | 62/175.5 |
| 2,089,558 | 8/1937 | Karwat | 62/175.5 |
| 2,470,305 | 5/1949 | Gross | 75/68 |

*Primary Examiner*—Benjamin R. Padgett
*Attorney, Agent, or Firm*—John A. Horan; Roland A. Anderson; Harmon S. Potter

EXEMPLARY CLAIM

3. Apparatus for the separation of a gas mixture comprised of a condensable constituent and a non-condensable constituent that comprises a trap chamber, a first source of said gaseous mixture, an auxiliary source of said non-condensable constituent, a conduit for delivering said gaseous mixture from said first source to said trap chamber and means responsive to the mol percentage of the non-condensable constituent at a point in said conduit for adding non-condensable constituent from said auxiliary source to said conduit to maintain the mol percentage of said non-condensable constituent at a constant value.

3 Claims, 1 Drawing Figure

3,859,808
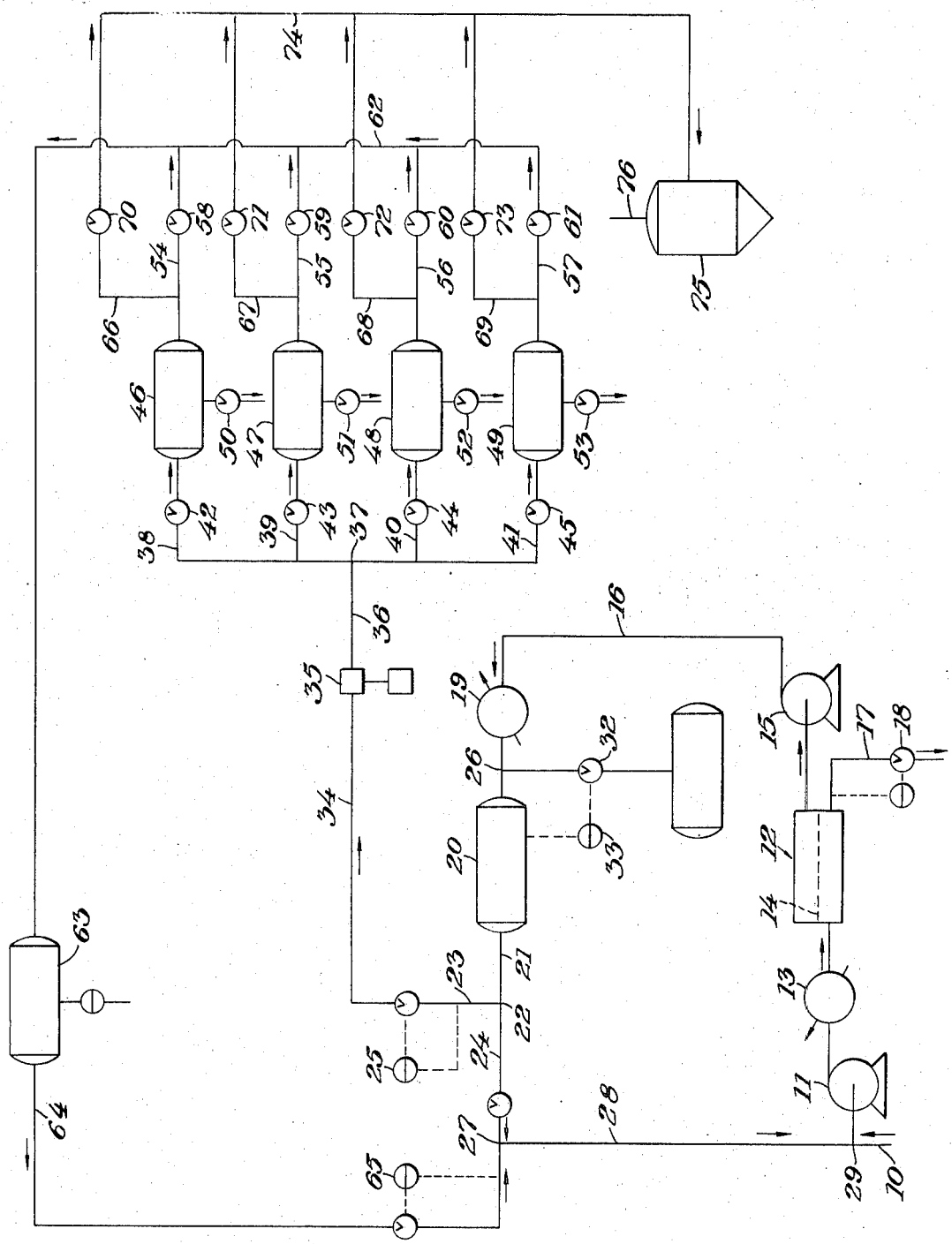

COLD TRAP FOR PURGING AIR FROM A GAS DIFFUSION SYSTEM

This invention relates to gas separation and is more particularly concerned with the diffusion separation of the relatively lighter and heavier components of a gaseous mixture containing constituents of different molecular weights.

The diffusion separation of mixtures of gases is based upon the principle that gases of relatively lower molecular weight will diffuse through a porous membrane or barrier at a more rapid rate than gases of relatively high molecular weight. Thus, a mixture of gases containing constituents of different molecular weight will, when charged to a porous membrane or barrier, separate into two fractions both differing in proportional composition from the charge mixture. Of these, the portion or fraction that diffuses through the barrier or membrane will contain an increased proportion of the lighter constituents of the mixture while the undiffused portion or fraction will contain an increased proportion of the heavier constituents of the mixture.

Of course, the degree of separation that can be effected in any one diffusion of a mixture of gases through a membrane depends upon the magnitude of the difference in molecular weight of the constituents of that mixture and, if this difference is small, the degree of change in proportional composition of the diffused fraction will be correspondingly small. Accordingly it is usually necessary to subject both fractions of an initial diffusion separation to a large number of additional diffusive separations. To this end a number of diffusion units or stages may be employed, each containing a porous membrane or barrier, together with means for charging a gas mixture to said barrier and separate means for withdrawing the diffused and undiffused fractions from opposite sides of the membrane or barrier. These stages are connected so that the diffused fraction from each is passed to the charging means of a succeeding stage in one direction while the undiffused fraction from each stage is passed to the charging means of a succeeding stage in the opposite direction.

By this arrangement, called the cascade arrangement, there are eventually concentrated in the opposite end stages of the systems two fractions, one containing a substantially increased proportion of the lighter constituents of the starting mixture and the other containing a substantially increased proportion of the heavier constituents thereof. Of course, the actual number of diffusion stages employed in any system depends upon the proportional composition of the starting mixture, the magnitude of the desired change in proportional composition and the magnitude of the difference in molecular weight between the constituents of the mixture.

Under theoretical conditions and assuming constant pressure and temperature conditions throughout the system, the volume rate of flow of gas between adjacent stages near the ends of the system is less than the volume rate of flow between adjacent stages near the point of feed, since the volume flow rate required to maintain the net transport of one of the constituents toward the end of the plant should be reduced as the other constituents are selectively removed, if the cascase is to be designed and operated in the most efficient manner. Thus, the gas circulating capacity of the stages of a theoretically perfect diffusion cascade is progressively reduced as one proceeds from the feed point to the product ends of the cascade.

In order to permit diffusive flow through the barriers of a diffusion system, while preventing mass or viscous flow, it is necessary to accurately control the size of the barrier pores. It has been found that these pores should have a diameter approximately one-tenth or less of the mean free path of travel of the gas molecules between collisions, averaged on the basis of the process mixture. This results in a requirement for pores of such extreme fineness that it is desirable to operate the system at subatmospheric pressures to increase the length of the mean free path of molecular travel between collisions and thereby mitigate the problem inherent in the minimum diameter requirements of the barrier pores. The advantages incident to operation at reduced pressure have been found to be sufficiently beneficial to warrant subatmospheric operation on a commercial scale.

Due to the fact that the number of units in a system may be large and because the system is preferably operated at subatmospheric pressures, it is virtually impossible to prevent inleakage of air from the surrounding atmosphere. If this air has a molecular weight less or greater than the constituents of the gases being treated in the cascade, there will be a net flow of air to the end of the plant from which the light or heavy constituent is withdrawn. This net flow of air has relatively little deleterious effect on the efficiency of separation in the stages of large capacity near the feed point, but it may have a very harmful effect on the efficiency of separation in the stages of small capacity near one or the other end of the plant. The reduction in separation efficiency caused by the air is approximately proportional to the concentration of air in the process stream. This, in turn, is proportional to the ratio of the net flow rate of air to the interstage flow rate of diffused gas. This ratio becomes progressively greater the nearer a stage is to the end of the cascade toward which the net flow of air occurs. The reasons for this are two. In the first place, air leakage is general throughout the system, and the net flow rate of air becomes greater toward the end of the cascade toward which the air flows because air from more and more leaks are added to the stream. In the second place, the interstage flow rate of diffused gases is progressively reduced the nearer a stage is to the end of the cascade.

Furthermore, in many instances, there is a tendency of the air to concentrate with the desired product of the separation. For example, this problem is particularly pronounced in the separation of uranium hexafluorides that differ in molecular weight only because of the presence therein of different isotopic forms of uranium of molecular weight 234, 235 and 238. In such cases the lighter constituents of the mixture, $U^{234}F_6$ and $U^{235}F_6$ have, respectively, molecular weights of 348 and 349, and are both substantially heavier than the principal components of air. Accordingly, air in the system diffuses more readily than the lighter constituents of the process gas and tends to concentrate in the light end of the system with $U^{234}F_6$ and $U^{235}F_6$. Furthermore, because the normal isotopic distribution of uranium is of the order of 16,700 atoms of $U^{238}$ to 120 atoms of $U_{235}$ to 1 atom of $U^{234}$, the final stages at the light end of a theoretical diffusion cascade for producing $U^{235}$ 90 percent pure from normal uranium have around 1/100,000 of the capacity of the stages near the feed point. Even in a practical cascade, the final stages of such a cascade will have of the order of 1/100 of the capacity of the stages near the feed point. Thus, as the air is passed from stage to stage toward the light end of the system, its concentration is increased by a factor of at least 100, with resultant reduction in the separation efficiency of the smaller stages toward the light end of the system.

It is therefore an object of this invention to provide a method and apparatus for eliminating undesired gaseous components from a diffusion gas separation system, and more particularly to provide for such elimination when the mixture contains at least two components more closely related in molecular weight than either is related to the undesired gas.

It is a further object of this invention to provide for the removal of inleaking air from a gaseous mixture being processed in a multiunit cascade diffusion separation system, and to effect such removal without change in the relative proportions of components of the process mixture existing at the unit at which the air removal is effected.

The invention, generally, involves the removal of the air at the light end of a diffusion system and at one or more intermediate stages throughout the system depending upon the degree of separation desired, the molecular weight of the desired constituent of the separation and the number of stages employed.

It is contemplated according to this invention that the diffused fraction of a gaseous mixture passing through a multistage diffusion separation system be withdrawn from the system between any two stages or at the end of any group of stages and subjected to purging by selective condensation and freezing to remove an undesired constituent and then returned to the source or another stage of the system in purged condition or collected for use.

A further and more specific object of this invention is to purge air from a mixture of uranium hexafluorides by selectively condensing the hexafluorides as solids, removing the contaminating air still in gaseous phase, and then restoring the hexafluorides to gaseous phase for further processing or collection.

Other objects and advantages of the invention will be apparent from a consideration of the following detailed description of a preferred embodiment thereof in conjunction with the annexed drawing wherein the single FIGURE is a diagrammatic flow sheet illustrating a portion of a diffusion gas separation cascade showing the flow path of the gaseous mixture to, through and from the freezing apparatus for purging the process gas mixture of undesired air.

While it is evident that the method and apparatus of the present invention are of wide applicability in the art of diffusion gas separation, the illustrated system will be described in connection with the separation of the isotopic forms of uranium hexafluoride from a starting mixture of normal isotopic composition containing about .006% of $U^{234}F_6$, about 0.71 percent of $U^{235}F_6$ and about 99.28 percent of $U_{238}$. The separation is conducted in order to obtain a fraction containing an increased proportion of a mixture of the two lighter isotopic forms and, to this end, a cascade diffusion system is employed involving a sufficient number of stages to bring about the desired degree of increase in proportional concentration of the lighter isotopic forms of the gas, some 4,000 stages being required to effect a substantially complete separation. These stages, while arranged in groups of varying size decreasing from the feed point to the end point, are similar in their broad aspects and those illustrated are typical.

In the illustrated embodiment of the invention, the diffused fraction of a gas mixture issuing from a prior stage of the system, not shown, is pumped through a conduit 10 to the intake side of a centrifugal pump 11 that delivers the gas to a diffusion chamber 12 through a heat exchanger 13. The diffusion chamber 12 is divided into a charging zone and a diffused gas zone by a finely porous diffusion barrier 14 and the gas delivered by the pump 11 enters the charging zone. A lighter fraction diffuses through the barrier 14 into the diffused gas zone and is withdrawn by a pump 15 and delivered through a conduit 16 while a heavier fraction is returned through a conduit 17 and a check valve 18 to the charging zone of the preceding separation stage, not shown.

For purposes of illustration let it be assumed that the concentration of air in the process mixture issuing from the pump 15 is such as to warrant a purging operation either before further processing or before collecting the end product. To effect purging the pump 15 discharges the gas through conduit 16 into and through heat exchanger 19 and into surge drum 20. From surge drum 20 the gas flows through a conduit 21 into a T connection at 22 whereat the flow is divided into a stream passing through conduit 23 and another stream passing through conduit 24. The flow of gas through conduit 23 is controlled by a flow responsive device diagrammatically indicated at 25. The function of this device, which is entirely conventional in its details of construction, is to supply gas from conduit 23 at a rate such that the cold trap purging device can function at high efficiency. That portion of the gas which cannot be accommodated in conduit 23 as the result of the operation of the flow controlling device 25 passes through conduit 24 to a T connection at 27. From this point it is passed through a conduit 28 to a T connection at 29 where it is mixed with the gas in conduit 10 and delivered to the charging side of pump 11 to be recycled to the diffusion stage at 12.

During the operation of the diffusion cascade the air concentration in the diffused gas zone, which is predominately nitrogen, may range up to about 75 mol. percent. For this reason the cold traps for the seperation of the air from the process gas are adjusted to operate with a gaseous mixture containing approximately 75 mol. percent of nitrogen. In order that efficiency of the traps may be maintained, the gaseous mixture within the drum 20 is continuously subjected to measurement for the purpose of determining the mol. percentage of nitrogen. To this end an instrument for determining the velocity of sound in the drum 20 is employed and is connected to adjust the position of a valve 32 to bleed nitrogen into a T connection at 26 for admixture with the stream feeding drum 20 when necessary to maintain mol. percentage of nitrogen in the drum 20 at the desired value. The concentration controlling device that is diagrammatically indicated at 33 forms no part of the present invention and may be of any conventional type. For example, the apparatus disclosed in Mickleson U.S. Pat. No. 2,283,750 issued May 19, 1942 may be employed.

It is to be understood that the selection of a gas mixture that is 75 mol. percent nitrogen as a charge stock for charging to the cold traps is rather an arbitrary figure and that the essential point is the maintenance of a constant mol. percent in the gaseous mixture charged to cold traps. In general, if the nitrogen concentration falls below the value for which the cold traps are designed the capacity of the traps for holding condensed process gas is appreciably reduced because most of the solid condenses near the inlet of the trap, there being insufficient nitrogen to distribute it more uniformly throughout the trap. Generally speaking, the higher specific value of the mol. percentage of nitrogen in the mixture charged to the cold trap the smaller are the numbers of traps required to purge a given rate of nitrogen. Of course, the higher the concentration of nitrogen in the top stage of the diffusion system, the greater the reduction in capacity of that stage will be. Thus the mol. percentage of nitrogen for which the traps are adjusted is rather an arbitrary figure and it has been found that the 75 per cent mol. figure given is satisfactory in the case of the separation of uranium hexafluorides that differ from each other in molecular weight.

The gaseous mixture in the drum 20 containing a predetermined mol. percent of nitrogen is withdrawn therefrom through conduits 21, 23 and 34 by a vacuum pump 35. This pump discharges through a conduit 36 into a T connection at 37. The arms of the T connection 37 lead into conduits 38, 39, 40 and 41 containing valves 42, 43, 44 and 45 respectively, which control flow to cold traps 46, 47, 48 and 49 respectively. The cold traps are drums that may be refrigerated in any conventional way, for example by the use of a liquid nitrogen refrigerant. Leading from the bottoms of cold traps 46, 47, 48 and 49 are valved discharge conduits 50, 51, 52 and 53. Withdrawal conduits 54, 55, 56 and 57 containing valves 58, 59, 60 and 61, respectively, lead from the ends of the traps 46, 47, 48 and 49 remote from the point of feed to said traps. The conduits 54, 55, 56 and 57 all are connected to conduit 62 that leads to a surge drum 63. From surge drum 63 a conduit 64 leads to the T connection 27 through a flow controlling or metering device 65 of conventional design. Conduits 66, 67, 68 and 69 are connected to withdrawal conduits 54, 55, 56 and 57 respectively at a point between the trap and the withdrawal conduit valve. The conduits 66, 67, 68 and 69 are provided respectively with valves 70, 71, 72 and 73 and on the other side of these valves the said conduits are connected to a line 74 which leads to a carbon absorber 75 that vents through a conduit 76 to atmosphere.

The operation of the cold traps may be best understood by example. Let it be supposed that cold trap 46 is refrigerated to a temperature of about −100°F. and is to be used to separate contaminating air from a mixture of uranium hexafluorides supplied by pump 35 through conduit 36. Since trap 46 is to be used valves 43, 44 and 45 are closed while valve 42 is opened. This being the case, all material issuing from conduit 36 into T connection 37 will flow through conduit 38 into refrigerated trap 46. Due to the controlled mol. percentage of nitrogen, the uranium hexafluoride, which condenses from the gas phase as solid, will be distributed rather uniformly through the trap 46. Since this is true, the material issuing through conduit 54 will be entirely air. Accordingly, valve 58 is closed and valve 70 is opened. Thus, the air issuing from the trap 46 passes through the conduit 54, into conduit 56, through valve 70, into conduit 74, through carbon absorber 75, and to atmosphere through conduit 76. This operation is continued until cold trap 46 reaches capacity. At this time valve 42 is closed and one of valves 43, 44 and 45 is open so that the mixture issuing from the pump 35 is lead to another cold trap which will be in proper refrigerated condition to effect separation. The valves of the second selected cold trap will be adjusted as indicated above in connection with cold trap 46 so that the air will eventually be discharged to atmosphere through the carbon absorber. Meanwhile valve 70 associated with valve 46 is closed and valve 58 may be opened. If then the cold trap is heated to a temperature of about 100° to 160°F., the uranium hexafluoride will again vaporize and will pass in vapor phase through conduit 54 and valve 58 into conduit 62, through surge drum 63 and ultimately through conduit 64, T connection 27, conduit 28, T connection 29 and pump 11 to the diffusion unit at 12. If, instead of returning the purged gas to the system, it is desired to collect the purged $UF_6$ as the end product, drain conduit 50 may be used and valve 58 may be maintained closed.

While the operation of but two of the cold traps has been fully described, it is to be understood that all four of the traps may be used in such a way that the purging may be continuously effected. Thus while the cold trap 46 is receiving and freezing out process material, the cold trap 47 may be passing through a refrigeration operation for the purpose of reducing its temperature to the desired value. While this is being done the gaseous phase purged material may be withdrawn from the cold trap 48 and the cold trap 49 may contain frozen process material that is being warmed.

In certain of the following claims the term "pure" has been used to describe the process material other than the contaminants that are removed by the methods and apparatus of the present invention.

It is understood that various modifications of the described embodiment of the present invention may be undertaken without departure from the spirit of the invention as expressed in the appended claims. In particular, any number of cold traps greater than one, and any number of vacuum pumps may be used.

I claim:

1. Apparatus for the separation of the constituents of a gaseous mixture, some of which may be condensed as solids while others remain uncondensed, that comprises a trap chamber, means for refrigerating said chamber, means for heating said chamber, a first source of said gaseous mixture, an auxiliary source of said uncondensable constituents, a conduit for delivering said gaseous mixture from said first source to said chamber, a measuring chamber in said conduit, means for continuously measuring the mol percentage of the uncondensable constituents in said measuring chamber, and means responsive to the measurements of said measuring means for adding uncondensable constituents from said auxiliary source to maintain the mol percentage of uncondensable constituents in said measuring chamber at a predetermined value such that the uncondensed constituents will distribute the condensable constituents as solids in the trap chamber.

2. In combination with a multistage diffusion plant for the separation of mixtures of gases that differ in molecular weight including a plurality of diffusion stages each comprised of a charging zone and a diffused gas zone, apparatus for purging less condensable gaseous contaminants from the more condensable pure gases processed in the diffusion system that comprises a trap chamber, a conduit connecting the diffused gas zone of one of said stages to said trap chamber, an auxiliary source of said less condensable contaminants, a measuring chamber in said conduit, means for continuously measuring the mol percentage of said less condensable contaminents in said measuring chamber, means responsive to the mol percentage of said less condensable contaminants in said measuring chamber for controlling the addition of less condensable contaminants from said auxiliary source to maintain the gaseous mixture charged to said trap chamber at a predetermined mol percentage of less condensable contaminants, means to refrigerate said trap chamber, and means to heat said trap chamber whereby the less condensable contaminants will distribute the more condensable pure gases as solids within said trap chamber while it is in refrigerated condition to cause the more condensable pure gases to freeze out whereupon the more condensable pure gases may be subsequently recovered in purified form by heating said trap chamber.

3. Apparatus for the separation of a gas mixture comprised of a condensable constituent and a non-condensable constituent that comprises a trap chamber, a first source of said gaseous mixture, an auxiliary source of said non-condensable constituent, a conduit for delivering said gaseous mixture from said first source to said trap chamber and means responsive to the mol percentage of the non-condensable constituent at a point in said conduit for adding non-condensable constituent from said auxiliary source to said conduit to maintain the mol percentate of said non-condensable constituent at a constant value.

* * * * *